United States Patent [19]

Jenkins, Jr.

[11] 4,165,174

[45] Aug. 21, 1979

[54] RECORDING APPARATUS

[75] Inventor: Leonard E. Jenkins, Jr., Denver, Colo.

[73] Assignee: Honeywell Inc., Minneapolis, Minn.

[21] Appl. No.: 844,353

[22] Filed: Oct. 21, 1977

[51] Int. Cl.[2] .......................... B26D 5/20; G03B 27/76; G03B 29/00

[52] U.S. Cl. .......................................... 355/29; 83/203; 355/20

[58] Field of Search ......................... 355/18, 20, 27–29; 83/262, 283, 203–205

[56] References Cited

U.S. PATENT DOCUMENTS

| | | | |
|---|---|---|---|
| 2,171,898 | 9/1939 | Scher | 83/205 |
| 3,277,756 | 10/1966 | Des Jardins et al. | 83/698 X |
| 3,452,627 | 7/1969 | Goodman et al. | 83/205 X |
| 3,558,802 | 1/1971 | Stein et al. | 355/20 X |
| 3,640,198 | 2/1972 | James | 355/28 X |
| 3,688,656 | 9/1972 | Applequist et al. | 355/40 X |
| 3,722,340 | 3/1973 | Kobayashi | 83/203 |
| 3,779,641 | 12/1973 | Hauck | 355/29 |

FOREIGN PATENT DOCUMENTS

| | | | |
|---|---|---|---|
| 2043234 | 10/1971 | Fed. Rep. of Germany | 355/29 |

*Primary Examiner*—Donald A. Griffin

*Attorney, Agent, or Firm*—Laurence J. Marhoefer; Lockwood D. Burton

[57] ABSTRACT

A recording apparatus includes a modular cutter assembly. The cutter assembly includes a rotary cutter blade which is spring biased into uniform engagement with a fixed complementary blade. An actuating lever for the cutter blade also includes the additional feature of serving as a guide platen between the cutter and the subsequent drive means for a record member. Further as the actuating lever is operated to actuate the cutter blade, a soft loop is formed in the record member to accommodate the brief halt in the record member feed at the cutter position and a continuous feed of the record member by the subsequent drive means. The modular cutter assembly is so positioned in the drive system as to allow the system to be self threading and further so positioned as to be conveniently accessible to an operator of the apparatus.

8 Claims, 3 Drawing Figures

RECORDING APPARATUS

BACKGROUND OF THE INVENTION

The present invention relates to recording apparatus. More particularly, it relates to a drive and shear means for driving and cutting off selected lengths of a record member.

In the art of graphic recording, there have been provided numerous different kinds of apparatus for producing images or traces on a record member. Some have fed pre-cut sheets of record receiving material past the recording stage. Others have supplied a continuous record from a lengthy roll of suitable record receiving material. Still others have provided means for supplying record receiving material in lengthy rolls, then cutting off desired lengths of the record receiving material either before or after the recording stage, to provide individual pages or sheets of the recorded intelligence. These have related to systems embodying various types of recording techniques such as photographic reproduction of preestablished recorded information, xerographic recording of light scanned material, xerographic recording of light patterns produced on the face of a cathode ray tube, photographic recording of light patterns produced on the face of a cathode ray tube, and the like.

Although the present invention is illustrated in the environment of a photographic recording of light patterns produced on the face of the cathode ray tube, it will be appreciated that the scope of the invention is not so limited.

In the recorders of the type wherein the recording material has been provided in the form of a lengthy roll, then desired lengths of the material are cut off to provide individual sheets, means have been provided for selectively shearing the recording material. Such shearing means as have been provided have not been entirely satisfactory on several counts. Because of the geometry of the systems heretofor provided, the shearing means is usually located so deep in the inward parts of the apparatus as to be relatively inaccessible for service. Some of the prior apparatus provide a scissor blade type of cutter which requires a substantial operating force for effective actuation. Others have provided a rotary type of blade which is actuated by means of a solenoid operating on the axial shaft of the rotary cutter. Again, that type of cutter requires a relatively large operating force.

SUMMARY OF THE INVENTION

It is, accordingly, an object of the present invention to provide an improved drive mechanism and cutter means for a recording apparatus.

It is another object of the present invention to provide an improved drive mechanism and cutter means for a recording apparatus which avoids the foregoing shortcomings of previous apparatus. It is a further object of present invention to provide an improved recording apparatus having a drive and a cutter means as set forth which is easily accessible to an operator.

It is yet another object of the present invention to provide an improved drive and cutter means as set forth which is relatively simple in structure and operation.

In accomplishing these and other objects, there has been provided, in accordance with the present invention, a recording apparatus including a modular cutter assembly. The cutter assembly includes a rotary cutter blade which is spring biased into uniform engagement with a fixed complementary blade. An actuating lever for the cutter blade also includes the additional feature of serving as a guide platen between the cutter and the subsequent drive means for a record member. Further, as the actuating lever is operated to actuate the cutter blade, a soft loop is formed in the record member to accommodate the brief halt in the record member feed at the cutter position and a continuous feed of the record member by the subsequent drive means. The modular cutter assembly is so positioned in the drive system as to allow the system to be self threading and further so positioned as to be conveniently accessible to an operator of the apparatus.

BRIEF DESCRIPTION OF THE DRAWINGS

A better understanding of the present invention may be had from the following detailed description when read in the light of the accompanying drawings, in which.

DETAILED DESCRIPTION

Figure 1:
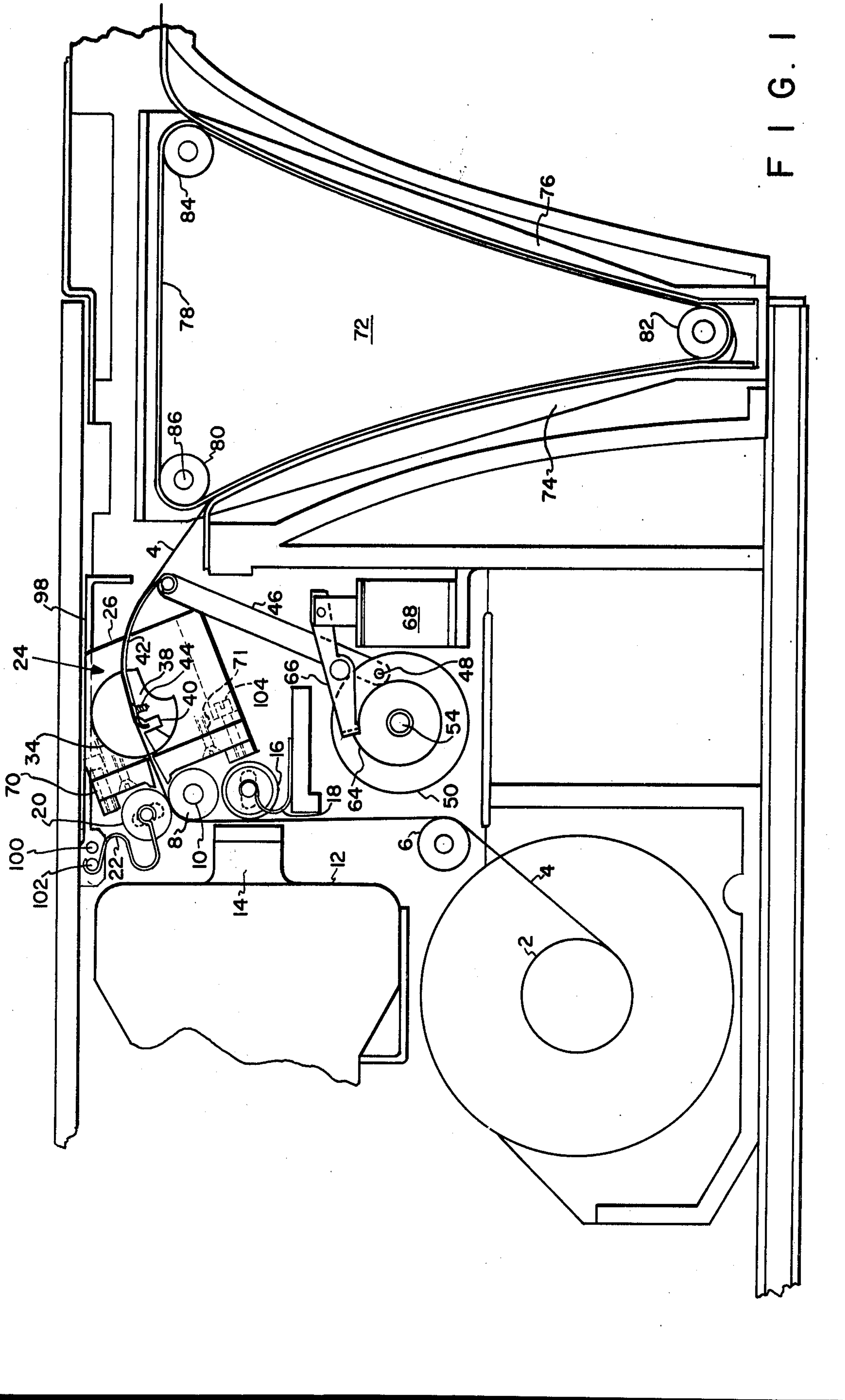
FIG. 1 is a cross-sectional view of a recording apparatus embodying the present invention.

Referring now to the drawings in more detail, there is shown in FIG. 1 recording apparatus having a supply roll 2 of a recording member 4. The recording member 4 is preferably of a light sensitive type wherein a light pattern produces a latent image on the record member which may be subsequently developed by the application of heat thereto. The record number 4 is drawn over an idler or guide roller 6, past a recording position to a drive roller 8. The drive roller 8 is mounted on a driven shaft 10. The recording position may comprise a cathode ray tube 12 having a fiber optics strip 14 extending laterally across the width thereof. A pressure roller 16 is positioned to press the recording member 4 against the face of the fiber optic strip 14. A spring 18 supplies the bias force urging the roller 16 toward the face of the fiber optic strip 14.

A second pressure roller 20 is urged by a spring 22 against the drive roller 8. The record member 4 is guided around the drive roller 8 between that roller and the pressure roller 20.

Figure 2:
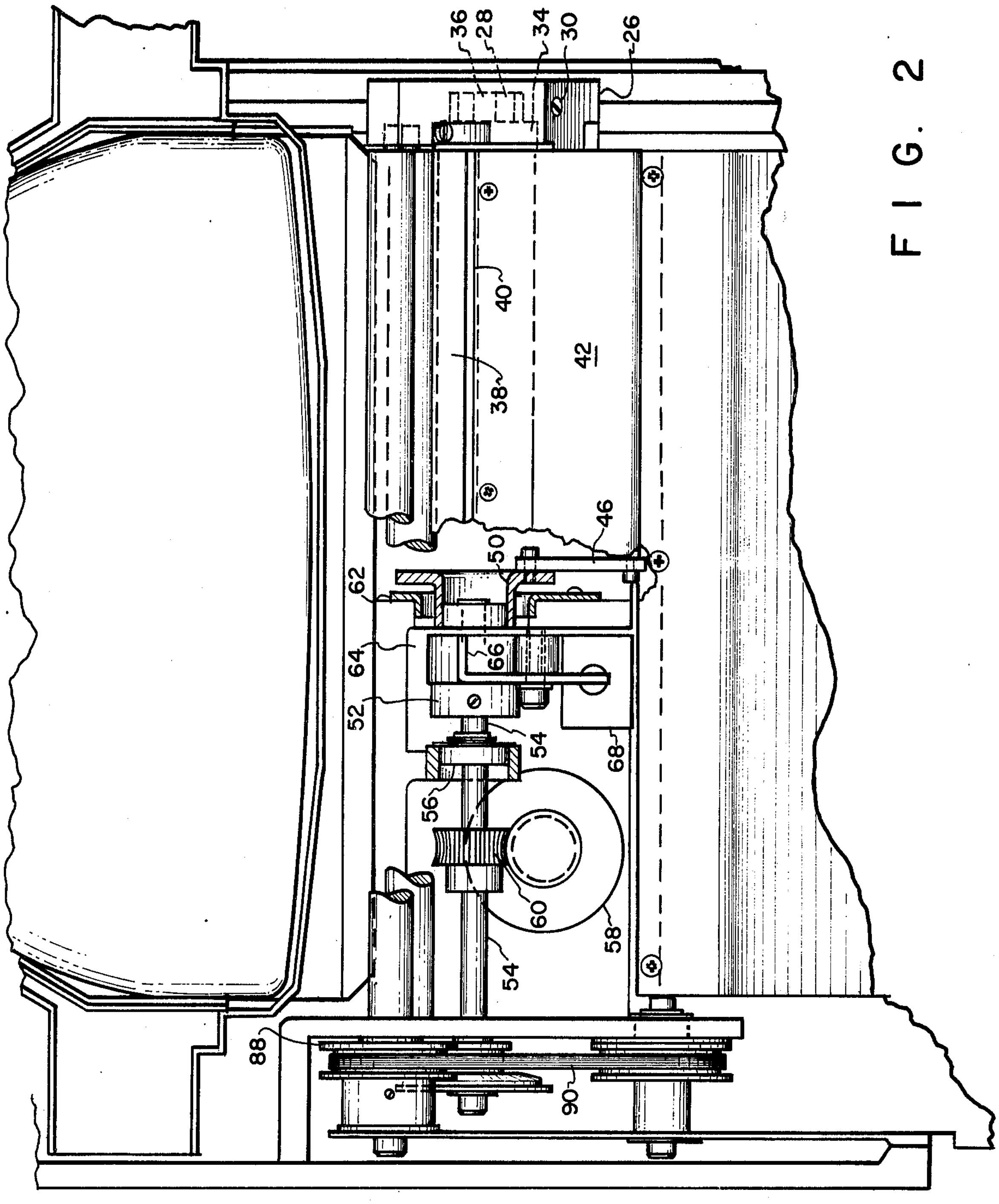
FIG. 2 is a top view of the apparatus shown in FIG. 1 and partly broken away.
Figure 3:
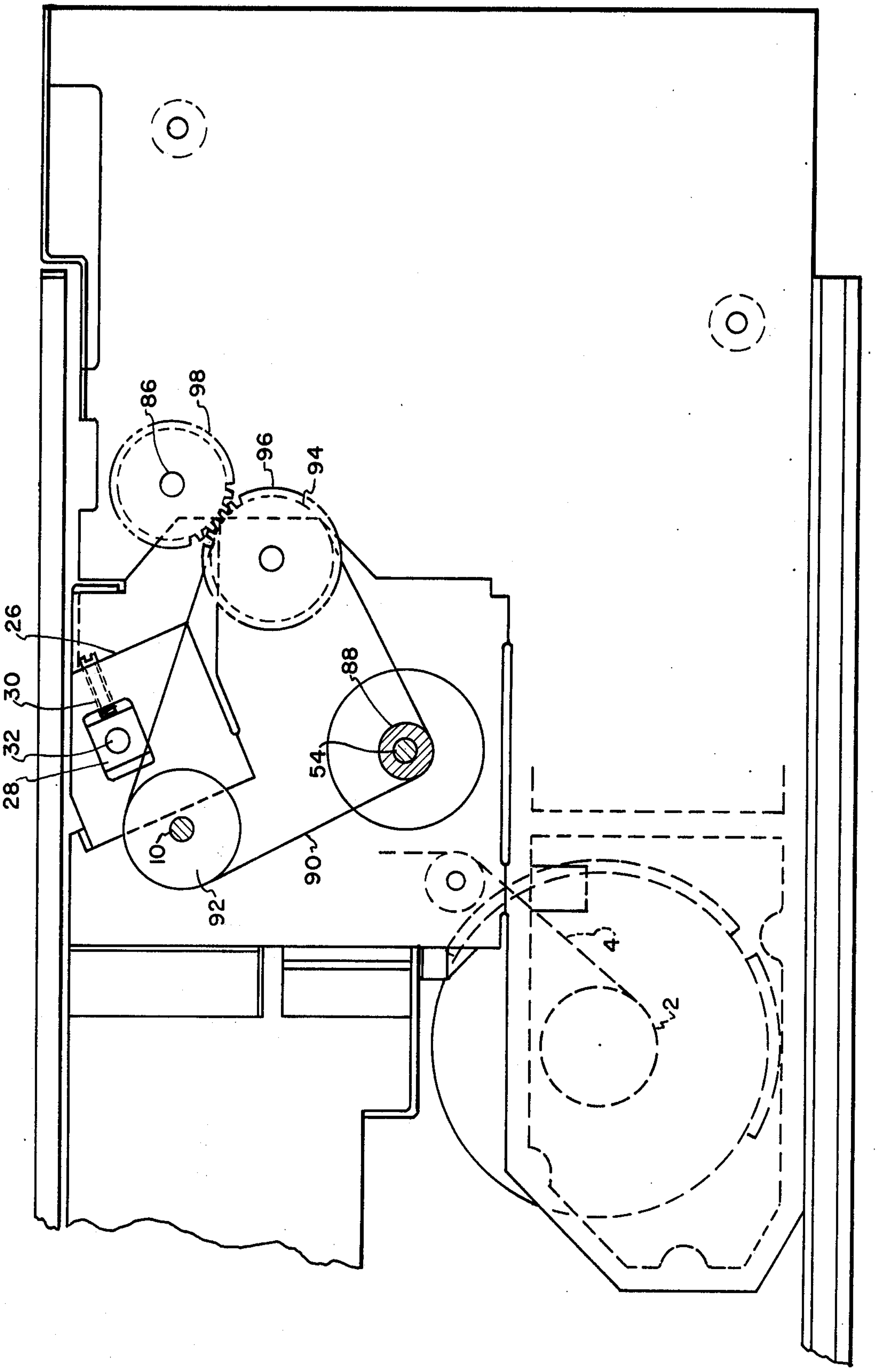
FIG. 3 is a cross-sectional view taken along the line 3—3 of FIG. 2.

Mounted immediately adjacent the drive roller 8 and the pressure roller 20, and positioned to receive the record member as it exits from between those two rollers, is a cutter module or assembly 24. The cutter module 24 includes a pair of end plate brackets 26, only one of which is shown in FIG. 2 because the figure is partially broken away. The end plate bracket is configured to receive a movable bearing block 28 (FIG. 3) which is biased in one direction by a spring loaded adjusting screw 30. The bearing block 28 has a central aperture 32. The cutting blade is formed with a pair of generally circular end members 34 having an axial pin 36 protruding from the outboard end of the end members. The pin 36 extends into and is carried by the aperture 32 in the bearing block 28. A cutting blade 38 extends between the two end members 34. The two end members 34 are substantially circular in configuration and coaxial with the pins 36. The blade 38 is eccentrically mounted with respect to the axis of rotation defined by the pins and has an outer surface which is coincidental with the diameter of the end members. The cutting edge of the blade is slightly skewed with respect to the axis of the blade assembly in order to provide a progressive shearing action across the width of the blade as the blade assembly is rotated. In an exemplary model, the blade itself was approximately 230 millimeters in length with a skew of approximately 4 millimeters of one end of the blade with respect to the opposite end or an angle of about 1°. The blade 38 extending between the two end member 34 occupies, in the position shown in FIG. 1 slightly less than the lower half of the cylinder defined by the two end members. A recessed groove 40 is provided extending the length of the blade 38. An actuator arm or platen 42 has the forward edge thereof bent downward to extend within the groove 40. The actuating arm or platen 42 is secured to the blade by suitable means such as a plurality of screws 44 positioned along the line parallel to the groove 40. The actuating arm or platen 42 extends in a curving plane down the trailing edge of the blade 38 to the trailing edge of the arm. A portion of the trailing edge of the actuating arm 44 is formed to provide a coupling to a driving link 46. One end of the link 46 is pivotally connected to the coupling arrangement of the actuating arm 42. The other end of the link 46 is connected to a crank pin 48 on a driving collar 50. The driving collar 50 is mounted on the output side of a once around clutch mechanism 52, the input side of which is connected to a driven shaft 54. The pin 48 and the collar 50 on the output side of the clutch 52 effectively constitute a crank arm for the actuator 42 through the link 46. The shaft 54 is supported in a bearing 56 and is driven by a motor 58 through a worm gear pair 60. The collar 50 is also supported in a bearing 62. The output of the once around clutch 52 is controlled by a cam 64 and a stopdog or pawl 66 operated selectively by a solenoid 68.

The cutter assembly 24 also includes a back-up blade structure 70. The back-up blade structure 70 is a rigid substantially planar structure, preferably of cast steel and has a tapered slot therethrough. The back-up blade structure 70 is secured to one face of the end plate brackets 26 as by a set of screws 71. The back-up blade is so positioned relative to the drive roller 8 and the pressure roller 20 that the wide end of the tapered slot is in juxtaposition and alignment with the line of contact between the roller 8 and the roller 20. A pair of lips protrude from the face of the back-up blade 70 adjacent the rollers 8 and 20 to extend the wide end of the slot into closer proximity to those rollers. By operation of the spring loaded adjusting screws 30 operating on the bearing block 28 in the end plate brackets 26 of the cutter module or assembly 24, the blade 38 is pressed into self adjusting cutting engagement with the face of the back-up blade 70 opposite from the face thereof adjacent the rollers 8 and 20.

In the assembled relationship here set forth, a recording medium 4 from the supply roll 2 is drawn past the fiber optics portion 14 of the CRT 12 by the driving action of the roller 8 and the pressure roller 20. During the passage of the recording medium past the fiber optics strip 14, the recording medium 4 is pressed into intimate contact with that fiber optic strip by the pressure roller 16. As the record medium 4 is drawn between the two rollers 8 and 20, it is fed out the other side between two protruding lips of the back-up blade 70 into the tapered slot thereof. From the tapered slot in the back-up blade structure 70, the record medium 4 is guided over the blade 38 and over the platen/actuator arm 42. The actuator arm 42 defines an upwardly bowed curved path for the record member 4. From the actuator arm 42, the record medium 4 is guided to a developer assembly 72.

The developer assembly 72 in the illustrative embodiment may be considered as one designed for use with heat developable record media. As such, the developer assembly includes a first polished heated platen member 74 and a second polished heated platened member 76 over both of which the record number is driven by an endless belt 78. The belt describes a substantially triangular path in its passage around a first or driven pulley 80 and a pair of idler pulleys 82 and 84. The driven pulley 80 is mounted on a shaft 86. As may be seen most clearly in FIG. 3, the shaft 54 which is driven by the motor 58 through the worm gear assembly 60 has mounted thereon a pulley 88 which drives a belt 90. The belt 90 drives a pulley 92 on the shaft 10. This, in turn, drives the driving pulley 8. The belt 90 also drives a pulley 94 which is coupled to a gear 96. The gear 96 meshes with a gear 98 mounted on the shaft 86. Thus as the belt 90 drives the pulley 94 and the gear 96, the gear 98 drives the shaft 86 on which is mounted the driven roller 80. Accordingly, the belt 78 is continuously driven by the motor 58.

In operation, the record medium 4 is drawn from the roll 2 over the guide roller 6 past the recording station represented by the fiber optics strip 14 of the cathode ray tube 12. The record medium is pressed against the face of the fiber optic strip by the pressure roller 16 to assure that intimate recording contact with the signal applied through the fiber optic strip. The driven roller 8 in cooperation with the pressure roller 20 applies the motive force to the record medium 4. As the record medium 4 exits from the rollers 8 and 20, it is guided into the slot through the back-up blade structure 70. From thence, the record member 4 is guided over the cutter 38 over the upwardly bowed platen/actuator arm 42 and into the developer assembly, to be driven past the heated platens 74 and 76 by the belt 78.

As the record member 4 is being drawn through the system as set forth, at predetermined intervals determined by suitable counting mechanism not herein shown, the solenoid 68 is actuated. The actuation of the solenoid causes the pawl or stopdog 66 to be rotated about its axis, removing the pawl from the shoulder of the cam 64 allowing the clutch 52 to be activated and drive the collar 50 through one revolution. As the collar 50 is rotated, the link 46 is pulled in a downward direction, as illustrated in FIG. 1, causing the cutter blade 38 to be rocked about the axis of the pins 36. The rocking of the blade 38 about that axis, causes the cutting edge of the blade 38 to be moved across the face of the slot in the back-up blade 70, shearing the record medium in the process. It will be noted that as the blade begins the shearing motion with respect to the record medium, the forward motion of the record medium is momentarily stopped. At the same time, the forward motion of the record medium through the developer assembly is continuous, uninterrupted. To accommodate the difference between the continuous motion in the developer assembly and the interrupted motion at the cutter assembly, a soft loop is formed in the record member as the platen-/actuating arm 42 is moved in the downward direction. The energization of the solenoid 68 is only momentary and allows the pawl to again block the rotary motion by engaging the cam 64 when the once around motion has been completed. When the cutter blade has been restored to its illustrated position, the record medium is again passed over the blade across the top of the platen-/actuator arm and into the developer assembly. Thus, there has been provided a shearing arrangement for a record medium which is effective with the aplication of a relatively small force. The eccentric rotary action of the cutter blade together with the platen/actuator arm provides a combination which requires a relatively small operating force applied through the clutch 52, the collar 50 and the driving link 46.

Additionally, the cutter module or assembly 24 is mounted near the top of the apparatus and, in operation, is concealed by a door 98 which is pivotable about a hinge 100. It will be noted that the other end of the s-shaped spring 22 which presses the pressure roller 20 into engagement with the driver roller 8 has its upper end mounted on a pin 102 attached to the cover 98 but in back of the hinge 100. When the cover 98 is lifted and rotated through approximately 135°, the spring 22 will be so positioned as to relieve the pressure on the roller 22 against the roller 8. Additionally, when the cover 98 is thus opened, the cutter module or assembly 24 is fully exposed and accessible for servicing. If it becomes necessary to remove the cutter assembly 24 from the apparatus, the two screws 104 may be removed from the end plate brackets 26 and the entire assembly readily removed through the opened door or cover 98.

Thus, there has been provided in accordance with the present invention, an improved drive mechanism and cutter means for recording apparatus in which the cutter mechanism is modular in form, requires a relatively small actuating force, and is conveniently located for easy access, and/or removal for purposes of service.

The embodiments of the invention in which an exclusive property or privilege is claimed are defined as follows:

1. In a recording instrument, a record medium driving and shearing means comprising:

a cutter assembly including a fixed blade member and a rotary action blade member mounted eccentrically with respect to the rotary axis thereof, an actuator arm connected to said rotary blade member, selectively actuated drive means connected to said actuator arm for selectively actuating said rotary blade member, said rotary blade member being positioned adjacent to said fixed blade member for cooperative shearing association therewith whenever said rotary blade member is actuated by said actuator arm, and spring biased bearing means supporting the ends of said rotary blade member and urging said rotary blade member toward said fixed blade member.

2. In a recording instrument, a record medium driving and shearing means comprising:

a cutter assembly including a fixed blade member and a rotary blade member, means defining an axis of rotation for said rotary blade member, said rotary blade member being mounted eccentrically with respect to said axis, a pair of end plate brackets for said cutter assembly, said fixed blade member being secured to a face of said end plate brackets, a pair of spring biased bearing means carried by said end plate brackets, respectively, supporting the ends of said rotary blade member and urging said rotary blade member into shearing contact with said fixed blade member, an actuator arm connected to said rotary blade member, and selectively actuated drive means connected to said actuator arm for selectively actuating said rotary blade member.

3. In a recording instrument, a record medium driving and shearing means comprising:

a cutter assembly including a fixed blade member and a rotary blade member, pin means defining an axis of rotation for said rotary blade member, said rotary blade member being mounted eccentrically with respect to said axis, said cutter assembly including a pair of end plate brackets, said fixed blade member being secured to a face of said end plate brackets, a pair of spring biased bearing means carried, respectively, by said end plate brackets supporting the pin means at the ends of said rotary blade member and urging said rotary blade member into self-adjusting shearing contact with said fixed blade member, an actuator arm connected to said rotary blade member, said actuator arm being in the form of an upwardly bowed sheet member substantially coextensive in width with the width of the blade portion of said rotary blade member whereby to provide a guide surface for an associated record medium, and selectively actuated drive means connected to said actuator arm for selectively actuating said rotary blade member.

4. Apparatus as set forth in claim 3 wherein said selectively actuated driving means comprises a driven shaft, a once around clutch, a crank arm on the output of said once around clutch coupled to said actuator arm, and a selectively actuated solenoid for selectively actuating said once around clutch.

5. In a recording instrument, a record medium driving and shearing means comprising:

a cathode ray tube recording station, means for driving a record medium past said recording station and through the recording instrument, a cutter assembly including a fixed blade member and a rotary blade member and a pair of end plate brackets, said fixed blade member being secured to a face of said end plate brackets, pin means defining an axis of rotation for said rotary blade member, said rotary blade member being mounted eccentrically with respect to said axis, a pair of spring biased bearing means carried, respectively, by said end plate brackets supporting the pin means at the ends of said rotary blade member and urging said rotary blade member into self-adjusting shearing contact with said fixed blade member, an actuator arm connected to said rotary blade member, said actuator arm being in the form of an upwardly bowed sheet member substantially coextensive in width with the width of the blade portion of said rotary blade member whereby to provide a quick surface for the record medium, and selectively actuated drive means connected to said actuator arm for selectively actuating said rotary blade member.

6. A recording instrument as set forth in claim 5 wherein said means for driving said record medium comprises a driven roller positioned adjacent to said fixed blade member, a pressure roller positioned to be in pressure contact with said driven roller and also positioned adjacent said fixed blade member, said record member being passed between said driven roller and said pressure roller and being drawn across said cathode ray tube recording station.

7. A recording instrument as forth in claim 6 wherein said fixed blade member comprises a substantially planar structure having a tapered slot therethrough, the wide end of the slot being positioned adjacent the line of contact between said driven roller and said pressure roller, said fixed blade member including a pair of protruding lips defining the wide end of the tapered slot and projecting that slot into close proximity to the line of contact between said driven roller and said pressure roller.

8. A recording instrument as set forth in claim 5 wherein said cutter assembly is positioned near the top of said recording instrument in a position to be readily accessible for service.

* * * * *